(12) United States Patent
Kim et al.

(10) Patent No.: US 10,592,759 B2
(45) Date of Patent: Mar. 17, 2020

(54) OBJECT RECOGNITION APPARATUS AND CONTROL METHOD THEREFOR

(71) Applicant: SAMSUNG ELECTRONICS CO., LTD., Suwon-si (KR)

(72) Inventors: Byoung-hyun Kim, Suwon-si (KR); Sang-yoon Kim, Yongin-si (KR); Kyoung-jae Park, Daejeon (KR); Ki-jun Jeong, Seoul (KR); Eun-heui Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 4 days.

(21) Appl. No.: 15/125,751

(22) PCT Filed: Mar. 9, 2015

(86) PCT No.: PCT/KR2015/002221
§ 371 (c)(1),
(2) Date: Sep. 13, 2016

(87) PCT Pub. No.: WO2015/137666
PCT Pub. Date: Sep. 17, 2015

(65) Prior Publication Data
US 2017/0004369 A1  Jan. 5, 2017

(30) Foreign Application Priority Data

Mar. 14, 2014  (KR) ........................ 10-2014-0030537

(51) Int. Cl.
G06K 9/00    (2006.01)
G06K 9/62    (2006.01)

(52) U.S. Cl.
CPC ..... *G06K 9/00926* (2013.01); *G06K 9/00288* (2013.01); *G06K 9/6255* (2013.01); *G06K 9/00221* (2013.01)

(58) Field of Classification Search
None
See application file for complete search history.

(56) References Cited

U.S. PATENT DOCUMENTS 6,611,622 B1 *  8/2003  Krumm .............. G06K 9/00228
                                                       382/165
8,135,220 B2    3/2012  Kim et al.
(Continued)

FOREIGN PATENT DOCUMENTS

JP  2010-238181 A    10/2010
KR  10-0300961 B1    9/2001
(Continued)

OTHER PUBLICATIONS

Written Opinion, issued by International Searching Authority in corresponding International Application No. PCT/KR2015/002221, dated May 14, 2015, (PCT/ISA/237).
(Continued)

Primary Examiner — Fred H Hu
(74) Attorney, Agent, or Firm — Sughrue Mion, PLLC

(57) ABSTRACT

An object recognition apparatus is disclosed. The present apparatus includes a storage unit for obtaining an initial image of a preset object and storing the initial image as a reference image; and a control unit for obtaining a first additional image of the preset object, determining whether the size of the first additional image relative to the initial image meets a first preset condition and additionally storing the first additional image as a reference image if the first additional image meets the preset condition.

12 Claims, 16 Drawing Sheets

(56) References Cited

U.S. PATENT DOCUMENTS

| | | | |
|---|---|---|---|
| 2003/0039380 A1* | 2/2003 | Sukegawa | G06K 9/00288 |
| | | | 382/118 |
| 2006/0018522 A1 | 1/2006 | Sunzeri et al. | |
| 2007/0122009 A1 | 5/2007 | Jee et al. | |
| 2008/0247611 A1* | 10/2008 | Aisaka | G06K 9/00261 |
| | | | 382/118 |
| 2009/0232364 A1* | 9/2009 | Hosoi | G06K 9/00261 |
| | | | 382/118 |
| 2010/0165113 A1 | 7/2010 | Abe | |
| 2011/0141257 A1* | 6/2011 | Hwang | G06K 9/6255 |
| | | | 348/77 |
| 2011/0222744 A1 | 9/2011 | Kim et al. | |
| 2012/0213420 A1 | 8/2012 | Steiner | |
| 2012/0294535 A1 | 11/2012 | Irmatov et al. | |
| 2013/0202159 A1* | 8/2013 | Jeon | G06K 9/00268 |
| | | | 382/116 |
| 2013/0202206 A1* | 8/2013 | Yi | G06T 5/00 |
| | | | 382/170 |
| 2014/0156364 A1* | 6/2014 | Zalewski | H04N 5/147 |
| | | | 705/14.4 |

FOREIGN PATENT DOCUMENTS

| | | |
|---|---|---|
| KR | 10-2007-0119105 A | 12/2007 |
| KR | 10-2008-0064923 A | 7/2008 |
| KR | 10-2008-0095441 A | 10/2008 |
| KR | 10-0886557 B1 | 3/2009 |
| KR | 10-1185243 B1 | 9/2012 |
| KR | 10-1214732 B1 | 12/2012 |
| KR | 10-2013-0112273 A | 10/2013 |
| KR | 10-1322168 B1 | 10/2013 |
| WO | 00/46752 A1 | 8/2000 |
| WO | 2011/096651 A2 | 8/2011 |

OTHER PUBLICATIONS

International Search Report, issued by International Searching Authority in corresponding International Application No. PCT/KR2015/002221, dated May 14, 2015, (PCT/ISA/210).
Communication dated Jul. 18, 2017 by the European Patent Office in counterpart European Patent Application No. 15761671.5.
Office Action dated Nov. 22, 2018 by the European Patent Office in counterpart European Patent Application No. 15761671.5.

* cited by examiner

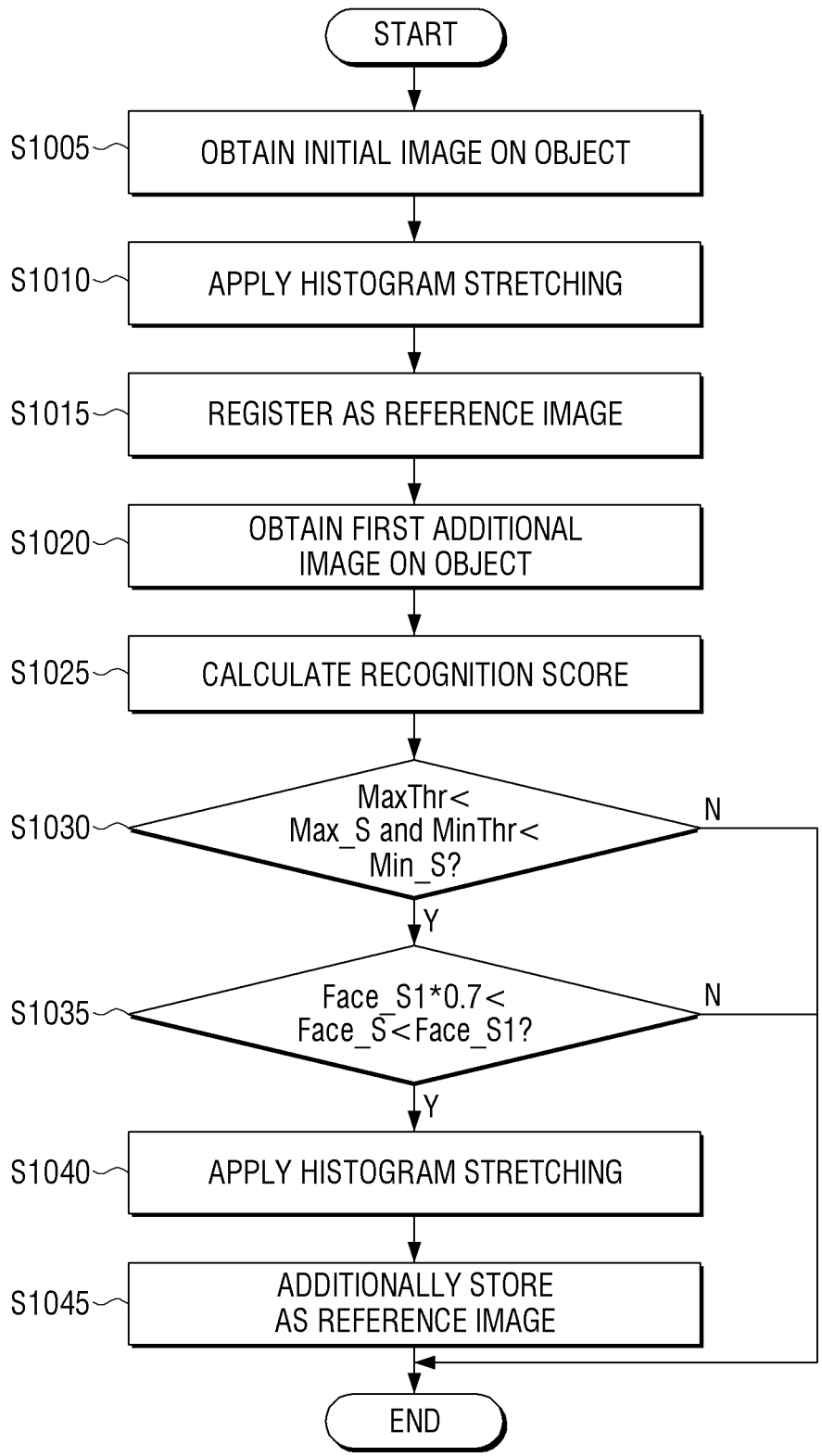

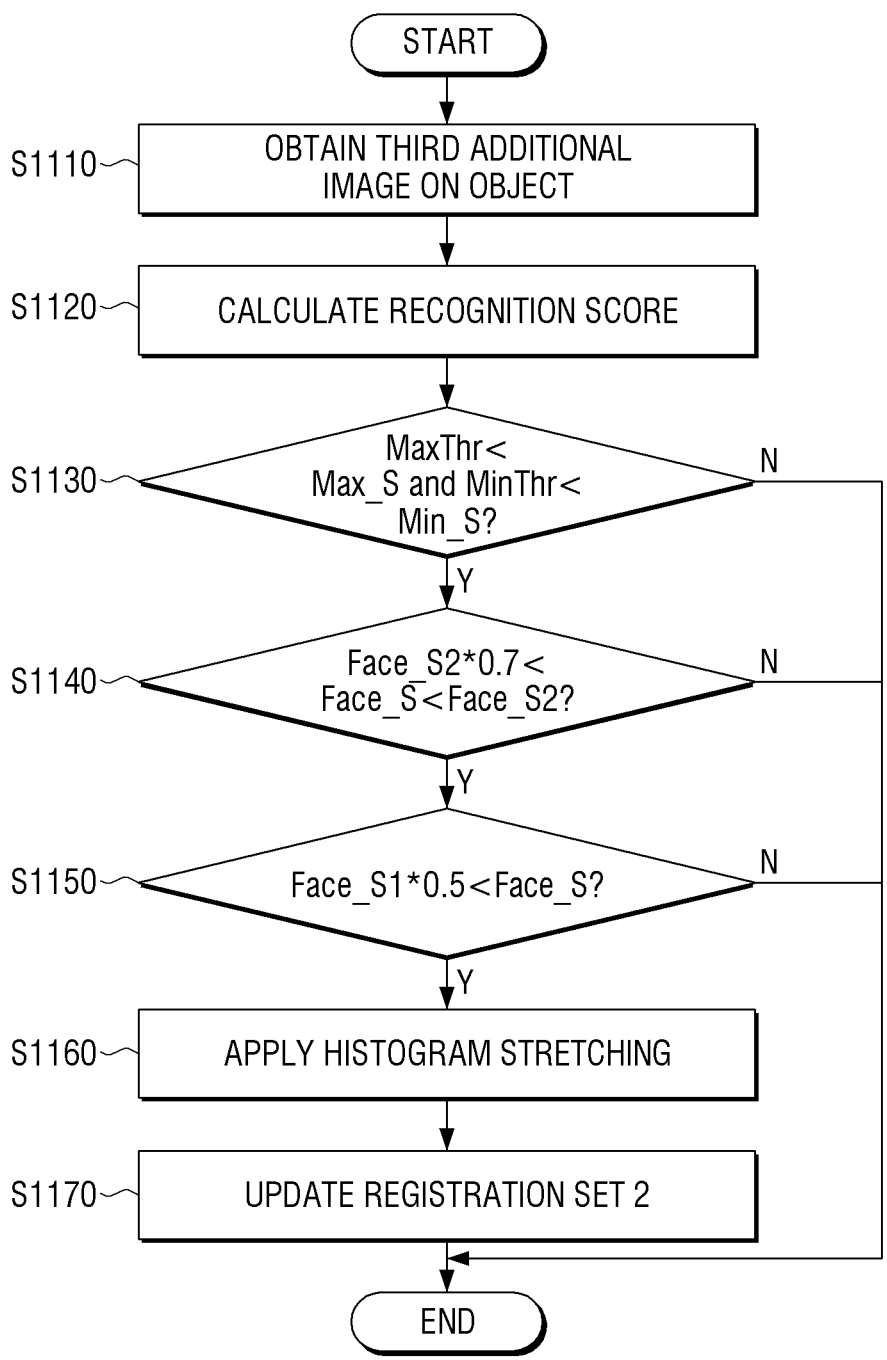

OBJECT RECOGNITION APPARATUS AND CONTROL METHOD THEREFOR

TECHNICAL FIELD

The present invention relates to an object recognition apparatus and a method therefor, and more particularly, to an object recognition apparatus which recognizes an object using a database, and a control method therefor.

BACKGROUND ART

In recent years, biometric technology has been highlighted in relation to personal authentication. In particular, various recognition systems are applied to electronic devices, and are utilized in an access security field. Since a recognition rate increases as various databases are established in such a recognition apparatus, it is important to establish databases.

Therefore, in the recognition technology field, it is necessary to establish various databases to enhance performance as well as performance of a recognition algorithm. To achieve this, a database may be additionally established in consideration of a user's recognition environment through an additional sensor such as an illuminance sensor, a distance sensor, or the like.

However, there is a problem that the utilization of the additional sensor is inefficient from the aspect of a cost.

DETAILED DESCRIPTION OF THE PRESENT DISCLOSURE

Technical Object

The present invention has been developed in order to solve the above-mentioned problems, and an object of the present invention is to provide an object recognition apparatus which is able to automatically and additionally establish and update a database, and a control method therefor.

Technical Solving Method

According to an exemplary embodiment of the present invention to solve the above-mentioned problems, a control method of an object recognition apparatus includes: obtaining an initial image regarding a predetermined object and storing as a reference image; obtaining a first additional image regarding the predetermined object, and determining whether a size of an object included in the first additional image relative to an object included in the initial image satisfies a first predetermined condition or not; and, in response to the first additional image satisfying the predetermined condition, adding and storing the first additional image as the reference image.

In addition, the storing as the reference image may include storing at least two images which are generated by applying different histogram stretching to the initial image as the reference image with the initial image.

In addition, the adding and storing as the reference image may include, in response to the first additional image satisfying the predetermined condition, storing at least two images which are generated by applying different histogram stretching to the first additional image as the reference image with the first additional image.

In addition, the determining whether the first predetermined condition is satisfied or not may include, in response to the size of the object included in the first additional image relative to the object included in the initial image falling within a range between a first predetermined ratio and a second predetermined ratio, determining that the first predetermined condition is satisfied.

In addition, the first predetermined ratio may be 70% and the second predetermined ratio may be 100%.

In addition, the determining whether the first predetermined condition is satisfied or not may include, in response to characteristic information of the object included in the first additional image being similar to characteristic information of the object included in the initial image, determining whether the size of the object included in the first additional image relative to the object included in the initial image satisfies the first predetermined condition or not.

In addition, the control method may further include: obtaining a second additional image regarding the predetermined object, and determining whether a size of an object included in the second additional image relative to the object included in the first additional image satisfies the second predetermined condition or not; and, in response to the second additional image satisfying the predetermined condition, adding and storing the second additional image as the reference image.

In addition, the control method may further include: obtaining a third additional image regarding the predetermined object, determining whether a size of an object included in the third additional image relative to the object included in the first additional image satisfies a third predetermined condition or not, and determining whether the size of the object included in the third additional image relative to the object included in the initial image satisfies a fourth predetermined condition or not; and, in response to the third additional image satisfying the third condition and the fourth condition, updating the first additional image with the third additional image.

In addition, the third condition may be a condition in which the size of the object included in the third additional image relative to the object included in the first additional image is 70%-100% inclusive, and the fourth condition may be a condition in which the size of the object included in the third additional image relative to the object included in the initial image is 50% or more.

In addition, the control method may further include recognizing the predetermined object based on the stored reference image.

In addition, the predetermined object may be a user's face.

According to an exemplary embodiment of the present invention, an object recognition apparatus includes: a storage configured to obtain an initial image regarding a predetermined object and store as a reference image; and a controller configured to obtain a first additional image regarding the predetermined object, and determine whether a size of an object included in the first additional image relative to an object included in the initial image satisfies a first predetermined condition or not, and, in response to the first additional image satisfying the predetermined condition, add and store the first additional image as the reference image.

In addition, the controller may be configured to store at least two images which are generated by applying different histogram stretching to the initial image as the reference image with the initial image.

In addition, the controller may be configured to, in response to the first additional image satisfying the predetermined condition, store at least two images which are generated by applying different histogram stretching to the first additional image as the reference image with the first additional image.

In addition, in response to the size of the object included in the first additional image relative to the object included in the initial image falling within a range between a first predetermined ratio and a second predetermined ratio, the controller may be configured to determine that the first predetermined condition is satisfied.

In addition, the first predetermined ratio may be 70% and the second predetermined ratio may be 100%.

In addition, the controller may be configured to obtain a second additional image regarding the predetermined object, and determine whether a size of an object included in the second additional image relative to the object included in the first additional image satisfies the second predetermined condition or not, and, in response to the second additional image satisfying the predetermined condition, add and store the second additional image as the reference image.

In addition, the controller may be configured to obtain a third additional image regarding the predetermined object, determine whether a size of an object included in the third additional image relative to the object included in the first additional image satisfies a third predetermined condition or not, and determine whether the size of the object included in the third additional image relative to the object included in the initial image satisfies a fourth predetermined condition or not, and, in response to the third additional image satisfying the third condition and the fourth condition, update the first additional image with the third additional image.

In addition, the controller may be configured to recognize the predetermined object based on the stored reference image.

In addition, the predetermined object may be a user's face.

Advantageous Effect

According to the above-described various exemplary embodiments, since the recognition rate of the object recognition apparatus can be enhanced, user's convenience can be improved.

BRIEF DESCRIPTION OF THE DRAWINGS

FIG. 10 is a flowchart to illustrate a method for additionally registering of a face recognition apparatus according to an exemplary embodiment of the present invention; and FIG. 11 is a flowchart to illustrate a method for updating of a face recognition apparatus according to an exemplary embodiment of the present invention.

BEST MODE FOR EMBODYING THE INVENTION

Mode for Embodying the Invention

Hereinafter, the present invention will be described in detail with reference to the accompanying drawings.

Figure 1:
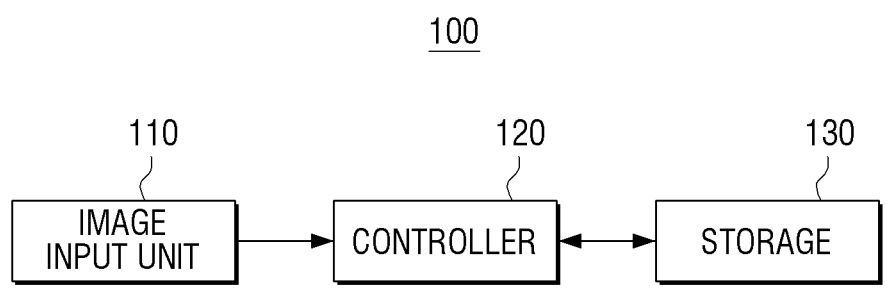
FIG. 1 is a block diagram illustrating a configuration of an object recognition apparatus according to an exemplary embodiment of the present invention.

FIG. 1 is a block diagram illustrating a configuration of an object recognition apparatus according to an exemplary embodiment of the present invention.

Referring to FIG. 1, the object recognition apparatus 100 according to an exemplary embodiment of the present invention includes an image input unit 110, a controller 120, and a storage 130.

The image input unit 110 performs a function of receiving an image from the outside. For example, the image input unit 110 may be implemented to receive an input from a camera provided in the object recognition apparatus 100 or receive a photographed image from the outside.

The storage 130 stores various data necessary for the operation of the object recognition apparatus 100.

In particular, the storage 130 performs a function of obtaining an initial image regarding a predetermined object and storing the initial image as a reference image. Herein, the predetermined object may be a person's face, but is not limited to this. For example, the predetermined object may be implemented by a person's hand.

Specifically, the storage 130 includes a database regarding an object. For example, in response to the object being a face, the database may have face characteristic information of a registered person and relevant information. Herein, the database may register or update data under the control of the controller 120.

In addition, the storage 130 may store programs and data for detecting an object region in recognizing an object and automatically correcting an exposure according to brightness of the object region.

In addition, the storage 130 may provide a storage place for processing an image inputted from the image input unit 110. In addition, the storage 130 may store various programs and data for controlling the overall operation of the object recognition apparatus 100, and may perform a function of temporarily storing data which is generated during the operation.

Herein, the storage 130 may be implemented by various storage devices such as a flash memory, a hard disk, or the like.

The controller 120 performs a control operation for various elements of the object recognition apparatus 100.

In particular, the controller 120 may obtain a first additional image regarding the predetermined object, and determine whether the size of the object included in the first additional image relative to the object included in the initial image satisfies a first predetermined condition. In this case, in response to the first additional image satisfying the predetermined condition, the controller 120 may additionally store the first additional image in the storage 130 as a reference image. Herein, in response to the size of the object included in the first additional image relative to the object included in the initial image falling within a range between a first predetermined ratio and a second predetermined ratio, it may be determined that the first predetermined condition is satisfied.

For example, the controller 120 may obtain an image photographed regarding a face, and, in response to the size of a face region included in the corresponding image relative to the initial image pre-stored in the storage 130 being 70-100% inclusive, the controller 120 may additionally store the corresponding image as a reference image.

In addition, the controller 120 may store at least two images which are generated by applying different histogram stretching to the initial image as reference images with the initial image (hereinafter, an image set including the initial image and the at least two images generated by applying different histogram stretching will be referred as "registration set 1."). Herein, the histogram stretching will be described below with reference to the drawings.

In addition, in response to the first additional image satisfying the predetermined condition, the controller 120 may store at least two images which are generated by applying different histogram stretching to the first additional image as reference images with the first additional image (hereinafter, an image set including the first additional image and the at least two images generated by applying different histogram stretching will be referred as "registration set 2."). Herein, the predetermined condition is a condition in which the size relative to the pre-stored initial image is 70%-100% inclusive as described above.

In addition, the controller 120 may obtain a second additional image regarding the predetermined object, and determine whether the size of the object included in the second additional image relative to the object included in the first additional image satisfies a second predetermined condition. In response to the second additional image satisfying the predetermined condition, the controller 120 may additionally store the second additional image as a reference image.

In addition, in response to the second additional image satisfying the predetermined condition, the controller 120 may store at least two images which are generated by applying different histogram stretching to the second additional image as reference images with the second additional image (hereinafter, an image set including the second additional image and the at least two images generated by applying different histogram stretching will be referred as "registration set 3."). Herein, the predetermined condition is a condition in which the size relative to the pre-stored first additional image is 70%-100% inclusive, for example.

In addition, the controller 120 may obtain a third additional image regarding the predetermined object, and determine whether the size of the object included in the third additional image relative to the object included in the first additional image satisfies a third predetermined condition or not, and whether the size of the object included in the third additional image relative to the object included in the initial image satisfies a fourth predetermined condition or not. In this case, in response to the third additional image satisfying the third condition and the fourth condition, the controller 120 may update the first additional image with the third additional image. Herein, the third condition may be a condition in which the size of the object included in the third additional image relative to the object included in the first additional image falls within a range of 70-100% inclusive. In addition, the fourth condition may be a condition in which the size of the object included in the third additional image relative to the object included in the initial image is greater than or equal to 50%.

Specifically, the controller 120 may detect and extract an object region from an input image, extract the size and characteristic information of the object, determine pre-registration at a database, calculate brightness on the object region, calculate an exposure correction value, and control exposure setting. To achieve this, the controller 120 may include an object recognition unit, which will be described below.

In addition, the controller 120 may analyze and register information regarding an object. The controller 120 may obtain an initial image from the image input unit 110 and register an object included in the initial image, and control to establish a database regarding the size information and characteristic information on the object. For example, in response to the object being a face and a user's face being inputted through the camera or the like, the controller 120 may extract a face region of inputted image data, and obtain size and characteristic information on the user's face and establish the database.

In addition, the controller 120 may store characteristic information of an object which is automatically given different light and darkness in the database, such that an object image having a change in illumination can be recognized. Specifically, the controller 120 may additionally generate a corrected image which is a result of correcting contrast and brightness of the image by applying histogram stretching to the obtained initial image, and control to form a set with the initial image and store the set in the database. Herein, the respective images in the formed set may be reference images for recognizing an additional image inputted thereafter or additionally registering. In this case, the number of images of the set may be set variously according to the degree of correction of the contrast and brightness. A detailed method for applying histogram stretching will be explained in detail below with reference to FIG. 4.

In addition, in response to an additional image being inputted, the controller 120 may obtain size and characteristic information of an object included in the additional image, and may determine similarity by comparing the object and the object included in the registered initial image. In this case, the similarity may be determined with respect to the images included the set, which are stored in the database and have undergone the histogram stretching.

In addition, the controller 120 may store characteristic information of an object the size of which is automatically changed in the database, such that an effect on the recognition rate depending on a user's distance during the recognition can be reduced.

Specifically, in response to the size of the object included in the additional image relative to the object included in the initial image satisfying a predetermined condition, the controller 120 may additionally register the additional image in the database, and control the additional image to be a new reference image for recognizing an object. In this case, the controller 120 may form a new set by applying histogram stretching to the additional image in the same way as in the initial image, and additionally register the new set in the database.

In addition, the controller 120 may control to continuously update the database, so that a smaller object can be recognized. Specifically, in response to the additional image being inputted and the size of the additional object relative to the object pre-stored in the database satisfying the predetermined condition, the controller 120 may control to update the database. Herein, the updating refers to substituting the images in the set stored in the database with the currently inputted additional image. Of course, the set pre-registered at the database may be substituted by applying histogram stretching to the additional image.

As described above, the object recognition apparatus 100 according to the present invention can efficiently establish various databases according to a change in a user recognition environment.

Figure 2A:
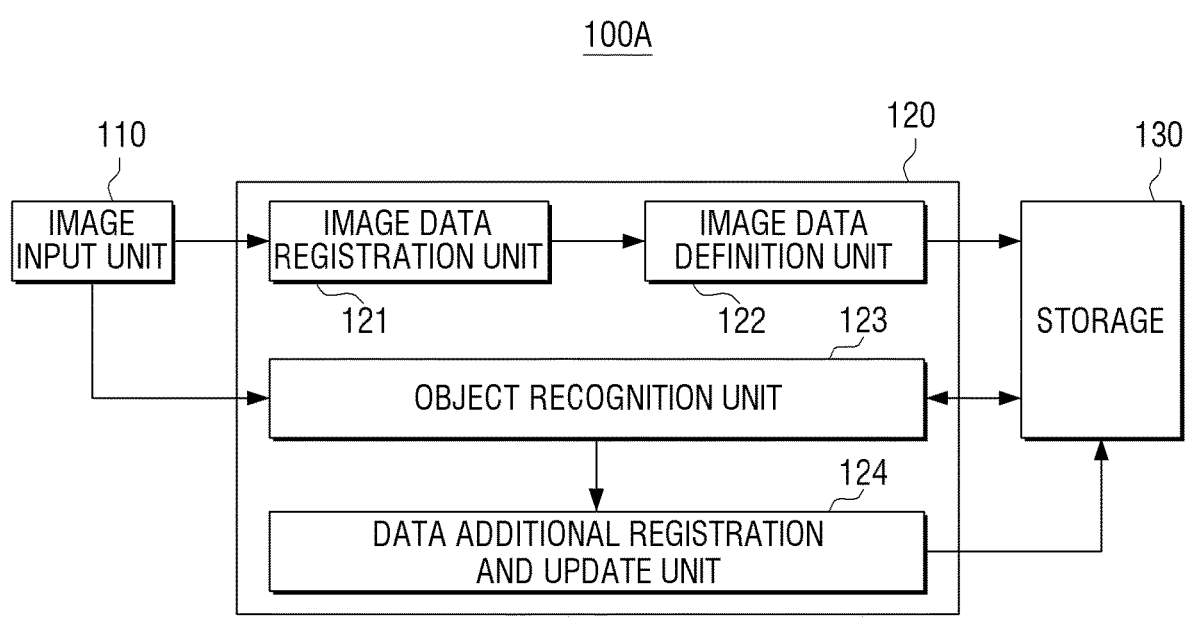
FIG. 2A is a block diagram illustrating a configuration of an object recognition apparatus according to another exemplary embodiment of the present invention.

FIG. 2A is a block diagram illustrating a configuration of an object recognition apparatus according to another exemplary embodiment of the present invention. Referring to FIG. 2A, the controller 120 according to another exemplary embodiment of the present invention includes an image data registration unit 121, a registration data definition unit 122, an object recognition unit 123, and a data additional registration and update unit 124. Hereinafter, the same elements as described in FIG. 1 will not be described.

The image data registration unit 121 is an element which obtains initial image data from the image input unit 110 and registers an object. The image data registration unit 121 may register the object in the image data as an initial image according to a user or the object, and manage the object. Information on the object included in the initial image registered by the image data registration unit 121 is transmitted to the registration data definition unit 122.

The registration data definition unit 122 may obtain size information on the object included in the initial image registered by the image data registration unit 121. The size information on the object may be a criterion for determining whether to additionally register an additional image to be inputted afterward in the database or not, or whether to update the database or not.

In addition, the registration data definition unit 122 may obtain characteristic information on the object included in the initial image. In this case, the registration data definition unit 122 may apply histogram stretching to the initial image and additionally obtain the characteristic information on each of the light and darkness-corrected images generated by the application of the histogram stretching. The size information and the characteristic information of the object obtained in this way may be transmitted to and stored in the database of the storage 130. In this case, the initial image may form a registration set with the light and darkness-corrected images to which the histogram stretching is applied, and may be stored in the database.

The object recognition unit 123 is an element which recognizes an object in additional image data transmitted from the image input unit 110. The object recognition unit 123 may obtain size information of the object in the image data, and determine similarity of the object by comparing the object in the initial image data registered by the image data registration unit 121, and the object in the additional image data. A detailed method for determining similarity of an object will be described in detail below with reference to FIG. 2B.

The data additional registration and update unit 124 may determine whether to register the additional image in the database according to the similarity information and the size information which are obtained by the object recognition unit 123. In response to the similarity satisfying a predetermined condition, it is recognized that the object in the registered initial image data and the object in the additional image data are the same. In response to the objects being recognized as being the same, a process is controlled to be performed according to the recognition, and also, it is determined whether the additional image is to be additionally registered at the database, and, in response to there being an additional image already stored in the database, it may be determined whether the additional image is updated or not. A detailed method for determining whether to additionally register the additional image and whether to update the additional image will be described in detail below with reference to FIGS. 5 to 7C.

Figure 2B:
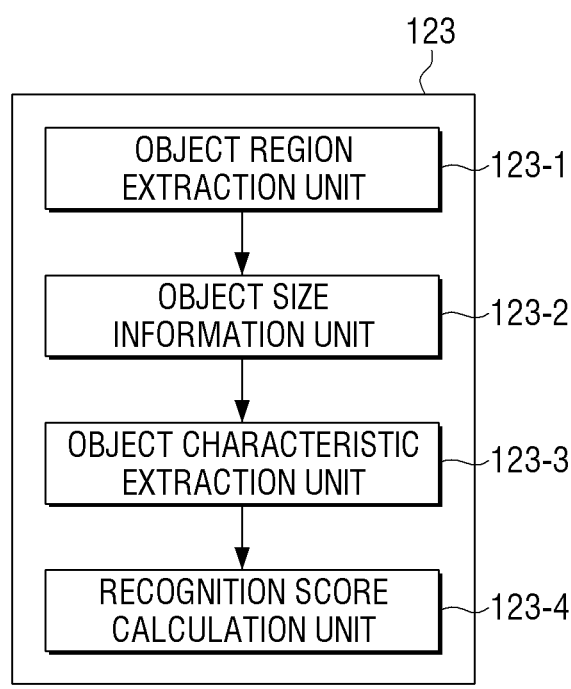
FIG. 2B is a block diagram illustrating a detailed configuration of an object recognition unit according to an exemplary embodiment of the present invention.

FIG. 2B is a block diagram illustrating the detailed configuration of the object recognition unit according to an exemplary embodiment of the present invention. Referring to FIG. 2B, the object recognition unit 123 according to an exemplary embodiment of the present invention includes an object region extraction unit 123-1, an object size information unit 123-2, an object characteristic extraction unit 123-3, and a recognition score calculation unit 123-4.

The object region extraction unit 123-1 is an element which extracts a target object region from an additional image through an object detection algorithm. The extracting the object region is a pre-process for recognizing an object, and can enhance a misrecognition rate in the process of extracting and recognizing characteristics of an object by exactly separating the object region and the background.

The object size information unit 123-2 is an element which extracts object information in consideration of the size in the data extracted by the object region extraction unit 123-1. The object size information unit 123-2 may determine whether to additionally register a database of an object of a new size based on the size information of the object obtained herein.

The object characteristic extraction unit 123-3 is an element which extracts a plurality of pieces of object characteristic information regarding the object image extracted by the object region extraction unit 123-1. For example, in response to the object being a face, a variety of characteristic information such as eye, nose, lip, face contour, face length, skin color, or the like may be extracted.

The recognition score calculation unit 123-4 is an element which determines similarity of the object by comparing the initial image stored in the database and the plurality of pieces of face characteristic information on the additional image.

Specifically, the recognition score calculation unit 123-4 may calculate a recognition score by comparing the characteristic information of the object included in the initial image registered at the database, and the characteristic information of the object included in the currently obtained additional image. In this case, the recognition score calculation unit 123-4 may calculate recognition scores regarding corrected images to which histogram stretching is applied by comparing, and obtain a maximum score value (Max_S) and a minimum score value (Min_S) from among the recognition scores.

For example, it may be assumed that the initial image forms a registration set with three images having different light and darkness in total through histogram stretching, and the registration set is established in the database. In this case, the recognition score calculation unit 123-4 may calculate three recognition scores in total by comparing the additional image and the three images. In this case, the maximum score value (Max_S) and the minimum score value (Min_S) may be obtained from among the three recognition scores, and similarity may be determined by comparing the maximum score value and the minimum score value and a maximum threshold (MaxThr) and a minimum threshold (MinThr) of a predetermined similar range.

The method for determining the similarity is performed based on Equation 1 presented below:

$$\text{MaxThr} < \text{Max\_}S \text{ and } \text{MinThr} < \text{Min\_}S \qquad \text{Equation 1}$$

That is, the object included in the additional image may be recognized as being the same as the object included in the initial image of the registration set in response to the maximum score value being greater than the maximum threshold and the minimum score value being greater than the minimum threshold. Only in response to the objects being recognized as being the same, data is processed and it is determined whether the additional image is to be additionally registered at the database in the data additional registration and update unit 124 based on the size information of the object.

Figure 3:
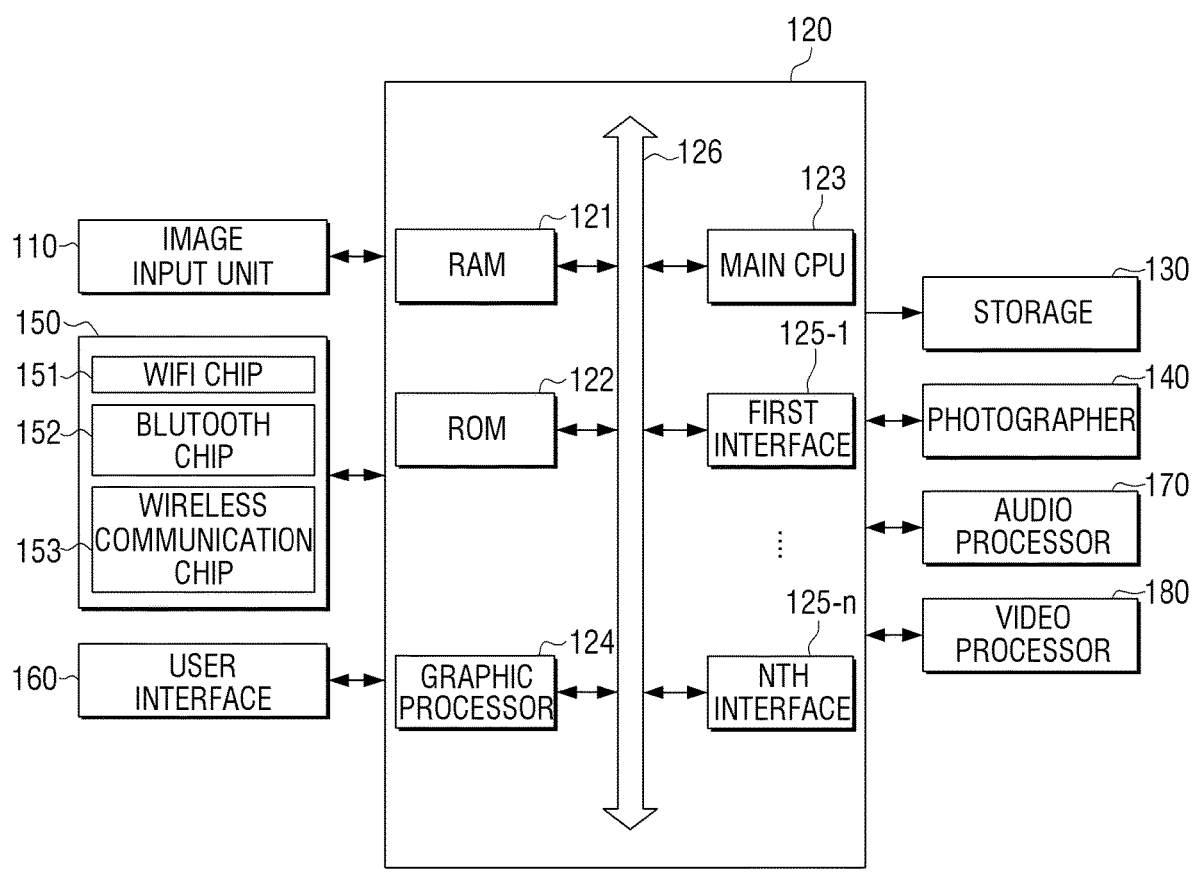
FIG. 3 is a block diagram illustrating a detailed configuration of a face recognition apparatus according to another exemplary embodiment of the present invention.

FIG. 3 is a block diagram illustrating a detailed configuration of a face recognition apparatus according to another exemplary embodiment of the present invention. Referring to FIG. 3, the face recognition apparatus 200 includes an image input unit 110, a controller 120, a storage 130, a photographer 140, a communication unit 150, a user interface 160, an audio processor 170, and a video processor 180. The same elements as the elements illustrated in FIG. 1 from among the elements illustrated in FIG. 3 will not be described in detail.

The controller 120 may control the overall operation of the face recognition apparatus 200 using various programs stored in the storage 130.

Specifically, the controller 120 may include a Random Access Memory (RAM) 121, a Read Only Memory (ROM) 122, a main Central Processing Unit (CPU) 123, a graphic processor 124, first to n-th interfaces 125-1 to 125-n, and a bus 126.

The RAM 121, the ROM 122, the main CPU 123, the graphic processor 124, and the first to n-th interfaces 125-1 to 125-n may be connected with one another via the bus 126.

The first to n-th interfaces 125-1 to 125-n may be connected with the above-described various elements. One of the interfaces may be a network interface which is connected with an external device via a network.

The main CPU 123 may access the storage 130 and perform booting using an operating system (O/S) stored in the storage 130. In addition, the main CPU 123 may perform various operations using various programs, contents, data, or the like stored in the storage 130.

The ROM 122 may store a set of instructions for booting a system. In response to a turn on command being inputted and power being supplied, the main CPU 123 may copy the O/S stored in the storage 130 into the RAM 121 according to a command stored in the ROM 122, and boot the system by executing the O/S. In response to the booting being completed, the main CPU 123 may copy various application programs stored in the storage 130 into the RAM 121, and perform various operations by executing the application programs copied into the RAM 121.

The graphic processor 124 may generate a screen including various objects such as an icon, an image, a text, or the like, using a calculator (not shown) and a renderer (not shown). The calculator (not shown) may calculate attribute values of objects to be displayed according to a layout of the screen, such as a coordinate value, a shape, a size, a color, or the like, based on a received control command. The renderer (not shown) may generate the screen of various layouts including objects based on the attribute values calculated by the calculator (not shown). The screen generated by the renderer (not shown) may be displayed in the display area of a display (not shown).

The communication unit 150 communicates with an external device according to various kinds of communication methods.

In particular, the communication unit 150 may communicate with various servers including an SNS server. Herein, the communication unit 150 may include various communication chips such as a WiFi chip, a Bluetooth chip, a wireless communication chip, and a Near Field Communication (NFC) chip. For example, the communication unit 150 may receive various image data necessary for face recognition from an external server or an external terminal.

In addition, the communication unit 150 may receive a variety of information such as a message, an e-mail, program update information, or the like from an SNS server, an e-mail server, a program management server, or the like.

The user interface 160 receives various user commands.

In particular, the user interface 160 may receive various user operations regarding a UI screen. Herein, when the face recognition apparatus 200 is implemented by a portable terminal, the user interface 160 may be implemented by a touch panel or a touch screen to receive a user touch input.

The audio processor 170 is an element for processing audio data. The audio processor 170 may perform various processing operations such as decoding, amplification, noise filtering, or the like with respect to the audio data.

The video processor 180 is an element for processing video data. The video processor 180 may perform various image processing operations such as decoding, scaling, noise filtering, frame rate conversion, resolution conversion, or the like with respect to the video data.

In addition, the face recognition apparatus 200 may include a speaker (not shown) to output various notification sounds or voice messages as well as various audio data processed in the audio processor 170, and a microphone (not shown) to receive a user voice or other sounds for controlling the face recognition apparatus 200 and convert the user voice or other sounds into audio data. The photographer 140 and the microphone (not shown) may be integrated into the above-described user interface 160 according to their functions.

In addition, the face recognition apparatus 200 may further include various external input ports to connect to various external terminals such as a headset, a mouse, a Local Area Network (LAN), or the like.

FIG. 3 illustrates an example of the detailed configuration included in the face recognition apparatus 200, and some of the elements illustrated in FIG. 3 may be omitted or changed and another element may further be added according to exemplary embodiments.

Hereinafter, a case in which the object is a user's face will be described by way of an example. In particular, a method in which the controller 120 of the face recognition apparatus 200 automatically establishes various databases in response to a change in the light and darkness and the size of the user face will be explain in detail. However, the present invention is not limited to the detailed method described below, and the database may be established in various methods.

Figure 4:
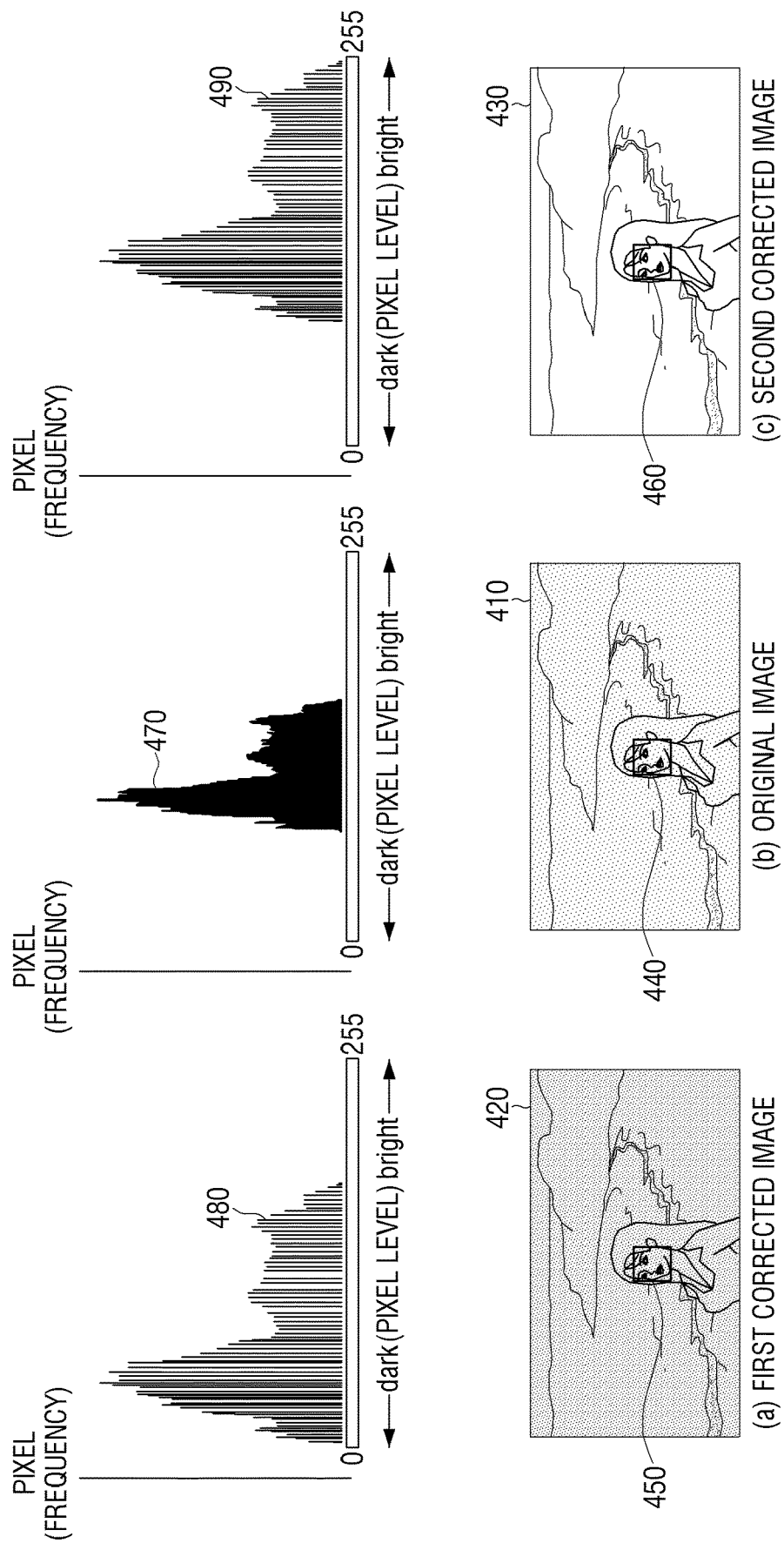
FIG. 4 is a view illustrating images to which histogram stretching is applied according to an exemplary embodiment of the present invention.

FIG. 4 is a view illustrating an image to which histogram stretching is applied according to an exemplary embodiment of the present invention.

Herein, the histogram refers to a graph showing distribution of values indicating a degree of light and darkness of pixels which form an image. That is, the histogram stretching refers to adjusting contrast or brightness of an image by adjusting the distribution of pixel levels of the image.

FIG. 4 is a view to illustrate the face recognition apparatus 200 which generates two images by adjusting contrast and brightness of an image differently, and establishes a database according to an exemplary embodiment of the present invention.

In FIG. 4, the horizontal axis of the histogram indicates pixel levels and the pixel levels range from 0 to 255. A pixel of a darker area has a pixel level closer to 0, and a pixel of a brighter area has a pixel level closer to 255. The vertical axis of the histogram refers to the frequency of pixels. For example, when more graphs of the histogram are concentrated on the low levels, that is, on the left portion, a relatively dark image is displayed. To the contrary, when more graphs of the histogram are concentrated on the high levels, that is, on the right portion, a relatively bright image is displayed. A first corrected image 420 of view (a) of FIG. 4 is a result of adjusting the brightness of an original image 410 to a predetermined lower limit, and a second corrected image 430 of view (c) of FIG. 4 is a result of adjusting the brightness of the original image 410 to a predetermined upper limit.

Referring to FIG. 4, the histogram 480 illustrated in the upper portion of view (a) of FIG. 4 is obtained by linearly expanding the opposite end values of the histogram 470 of the original image 410 and then increasing the frequency of pixels to be relatively high in a dark pixel level area.

The histogram 490 illustrated in the upper portion of view (c) of FIG. 4 is obtained by linearly expanding the opposite end values of the histogram 470 of the original image 410 and then increasing the frequency of pixels to be relatively high in a bright pixel level area. That is, the first corrected image 420 is corrected to be relatively dark in relation to the original image 410, and the second corrected image 430 is corrected to be relatively bright.

In addition, by increasing a difference in the contrast by expanding the opposite end values of the histogram, the sharpness can be increased and thus it is easy to extract a face's characteristic. Accordingly, face images 450 and 460 having their light and darkness adjusted may be additionally generated, in addition to a face image 440 included in the original image 410, and characteristic information of the respective faces may be extracted and may form a registration set in the database.

By applying the histogram stretching as describe above, a misrecognition rate which is caused by a change in the face according to an illumination can be enhanced without requiring an additional cost.

The method for adjusting the histogram and the degree of adjustment may be pre-set by the user and stored. In addition, the number of automatically generated additional images forming the registration set may be variously changed.

Figure 5:
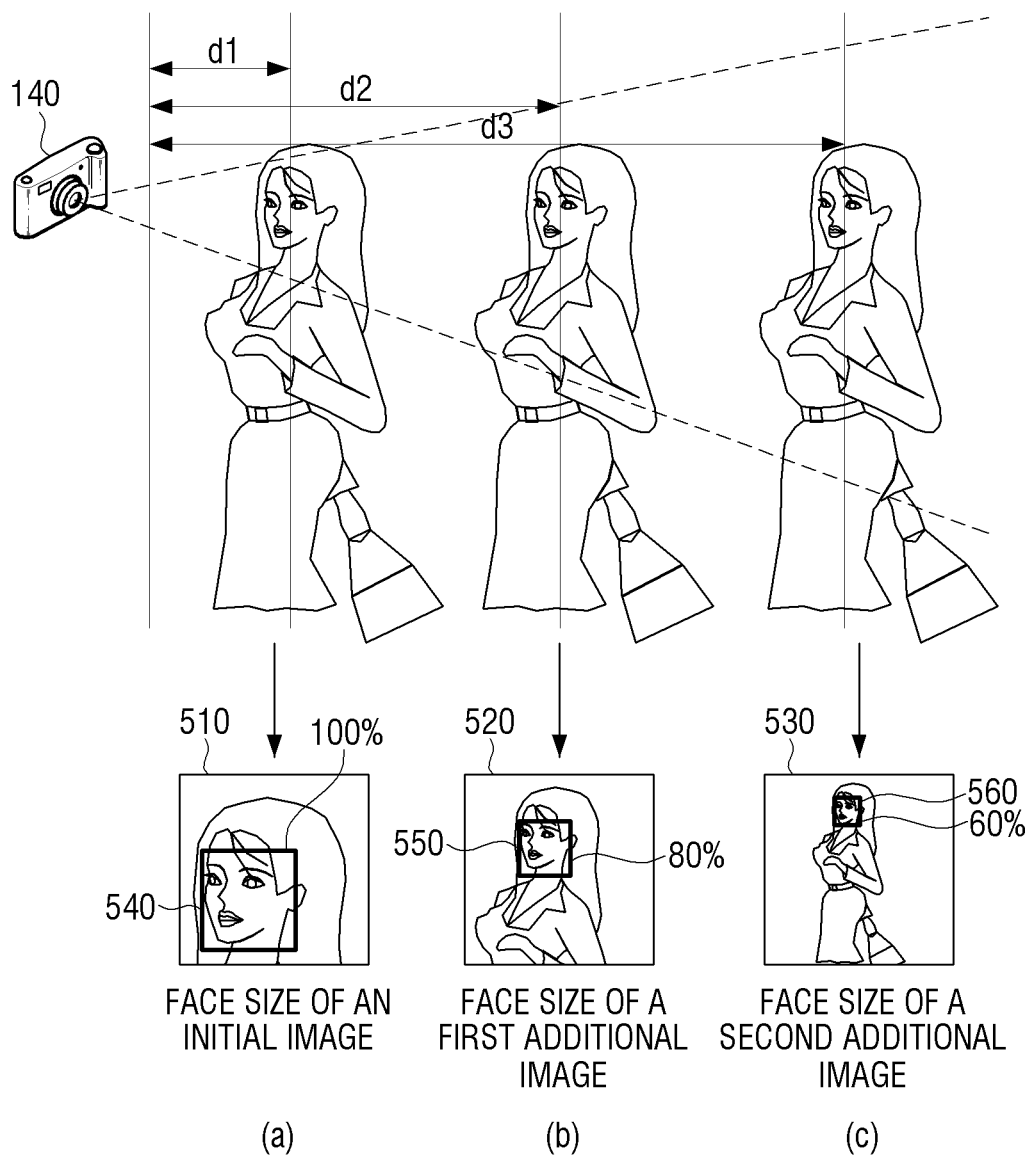
FIG. 5 is a view showing a relationship between a recognition distance and a size of a recognized face according to an exemplary embodiment of the present invention.

FIG. 5 illustrates a relationship between a recognition distance and a size of a recognized face according to an exemplary embodiment of the present invention.

View (a) of FIG. 5 illustrates a size of a face which is recognized in the recognition apparatus in response to the user being distanced from the photographer 140 by d1.

View (b) of FIG. 5 illustrates a size of a face which is recognized in the recognition apparatus in response to the user being distanced from the photographer 140 by d2. This assumes that the size of a face 550 included in a first additional image 520 is reduced to be 80% when the size of a face 540 included in an initial image 510 is 100%.

View (c) of FIG. 5 illustrates a size of a face which is recognized in the recognition apparatus in response to the user being distanced from the photographer 140 by d3. This assumes that the size of a face 560 included in a second additional image 530 is reduced to be 60% when the size of the face 540 included in the initial image 510 is 100%.

That is, as the distance from the photographer 140 to the face increases, the size of the recognized face is smaller. Accordingly, in response to the same face being recognized but the recognition distance increasing, a recognition rate may be reduced. Accordingly, there is a demand for a method for establishing various databases so as to recognize a face even in response to the size of the face being reduced to a predetermined range. A detailed method for establishing a database regarding the size of a face will be described in detail with reference to FIGS. 6 to 7C.

According to an exemplary embodiment of the present invention, in response to a first additional image regarding a user's face being obtained, and only in response to the size of the face included in the first additional image relative to the face included in the initial image satisfying a first predetermined condition, the first additional image may be added to and stored in the database as a reference image. In this case, by applying histogram stretching to the first additional image, registration set 2 is formed and stored. The first condition may be changed variously, and accordingly, object images of various sizes may be established in the database.

In addition, according to an exemplary embodiment of the present invention, the first condition may be a condition in which the size of the face included in the first additional image relative to the face included in the initial image falls within a range between a first predetermined ratio and a second predetermined ratio. A difference between the size of the face included in the currently added image (Face_S), that is, the size of the face included in the first additional image, and the size of the face included in the initial image (Face_S1) may be to the extent that the face recognition apparatus can recognize the face of the first additional image based on the initial image, maintaining a predetermined reliability level. For example, as the difference in the sizes of both faces increases, the reliability level is reduced.

Specifically, according to another exemplary embodiment of the present invention, in response to the first predetermined ratio being 70% and the second ratio being 100%, a high reliability level can be maintained. A method for determining whether the first condition is satisfied or not is performed based on Equation 2 presented below:

$$\text{Face\_S1} \times 0.7 < \text{Face\_S} < \text{Face\_S1} \qquad \text{Equation 1}$$

Table 1 shows a relationship between a size ratio of a face and a reliability level according to an exemplary embodiment of the present disclosure.

TABLE 1

| | Ratio | Reliability Level |
|---|---|---|
| (a) | Face_S1*0.90 < Face_S < Face_S1 | about 100% |
| (b) | Face_S1*0.75 < Face_S < Face_S1 | about 96% |
| (c) | Face_S1*0.55 < Face_S < Face_S1 | about 80% |

As shown in table 1, in response to the first ratio of the first condition being set to 90% ((a) of table 1), the reliability level reaches about 100%. In addition, in response to the first ratio of the first condition being set to 75% ((b) of table 1), the reliability level reaches about 96%. In addition, in response to the first ratio of the first condition being set to 55% ((c) of table 3), the reliability level reaches about 80%.

That is, it may be determined that the ratio guaranteeing the reliability level close to 100% is meaningful for the recognition rate of the face. Accordingly, only in response to the size of the first additional image relative to the initial image satisfying the range of 70-100% inclusive, the first additional image is registered at the database, and thus the high recognition rate of the object recognition apparatus can be maintained.

According to an exemplary embodiment of the present invention, in response to a second additional image regarding the user's face being obtained, and only in response to the size of the face included in the second additional image relative to the face included in the first additional image satisfying a second predetermined condition, the second additional image may be added to and stored in the database as a reference image. In this case, by applying histogram stretching to the second additional image, registration set 3 is formed and stored. The second condition may be changed variously, and accordingly, face images of various sizes may be established in the database.

In addition, according to an exemplary embodiment of the present invention, the second condition may be a condition in which the size of the face included in the second additional image relative to the face included in the first additional image falls within a range between a first predetermined ratio and a second predetermined ratio. A difference between the size of the face included in the currently added image (Face_S), that is, the size of the face included in the second additional image, and the size of the face included in the first additional image (Face_S2) may be to the extent that the face recognition apparatus can recognize the face of the second additional image based on the first additional image, maintaining a predetermined reliability level. For example, as the difference in the sizes of both faces increases, the reliability level is reduced.

Specifically, according to another exemplary embodiment of the present invention, in response to the first predetermined ratio being 70% and the second ratio being 100% as in the first condition, a high reliability level can be maintained. A method for determining whether the second condition is satisfied or not is performed based on Equation 3 presented below:

$$\text{Face\_S2} \times 0.7 < \text{Face\_S} < \text{Face\_S2} \quad \text{Equation 3}$$

According to an exemplary embodiment, in response to the database being already established to include up to registration set 3, an image added thereafter is not registered any more and the database is substituted and updated in response to the added image satisfying a predetermined condition. Specifically, on the assumption that a third additional image regarding the user's face is obtained, in response to the size of the face included in the third additional image relative to the face included in the first additional image satisfying a predetermined third condition, and the size of the face included in the third additional image relative to the face included in the initial image satisfying a fourth condition, the first additional image may be updated with the third additional image (updating of registration set 2). The third condition and the fourth condition may be changed variously, and accordingly, object images of various sizes may be established in the database.

In addition, according to an exemplary embodiment, the third condition may be a condition in which the size of the face included in the third additional image relative to the face included in the first additional image falls within a range of 70%-100% inclusive. In addition, the fourth condition may be a condition in which the size of the face included in the third additional image relative to the face included in the initial image falls within a range of 50% or more.

A method for determining whether the fourth condition is satisfied or not may be performed based on Equation 4 presented below:

$$\text{Face\_S1} \times 0.5 < \text{Face\_S}$$

In response to registration set 3 being updated, the third condition may be a condition in which the size of the face included in the third additional image relative to the face included in the second additional image falls within a range of 70%-100% inclusive in the same way as described above. In addition, the fourth condition may be a condition in which the size of the face included in the third additional image relative to the face included in the first additional image falls within a range of 50% or more.

Figure 6A:
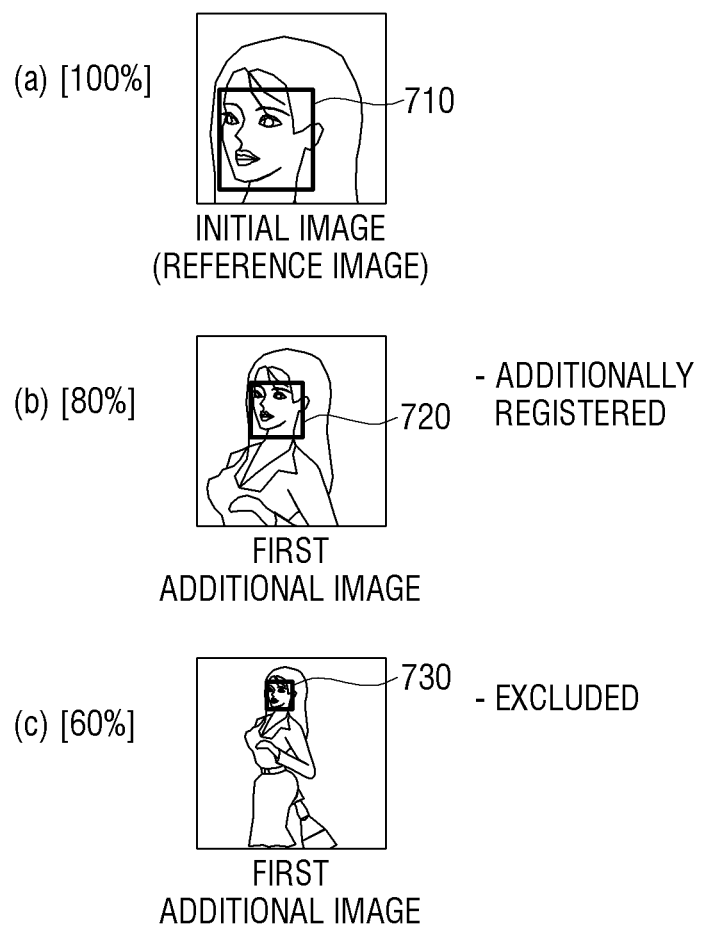
FIGS. 6A to 6C are views illustrating a method for determining whether to additionally register and update an additional image according to an exemplary embodiment of the present invention.
Figure 6B:
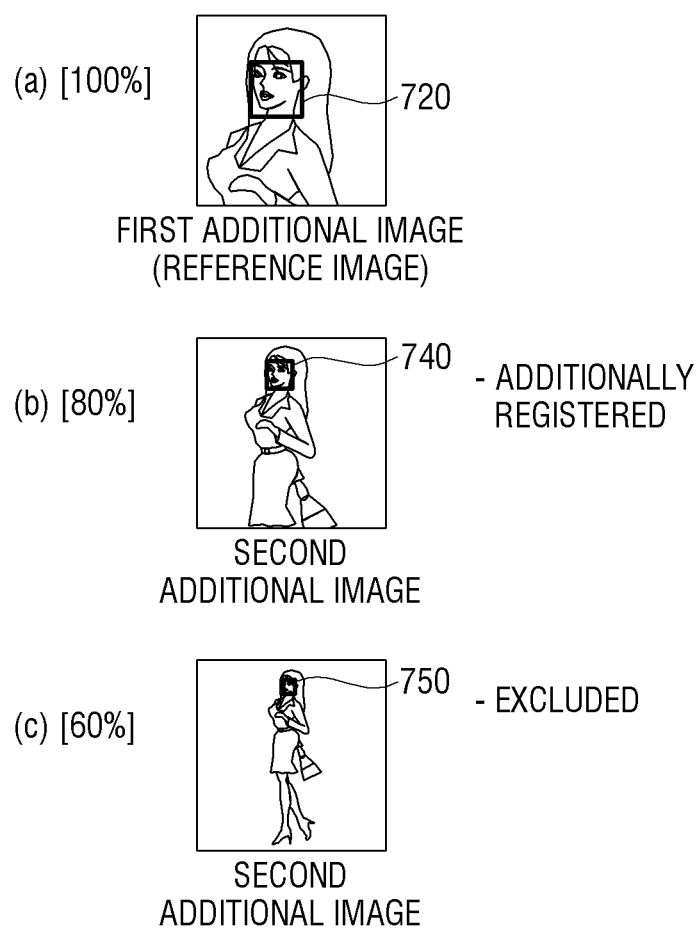
Figure 6C:
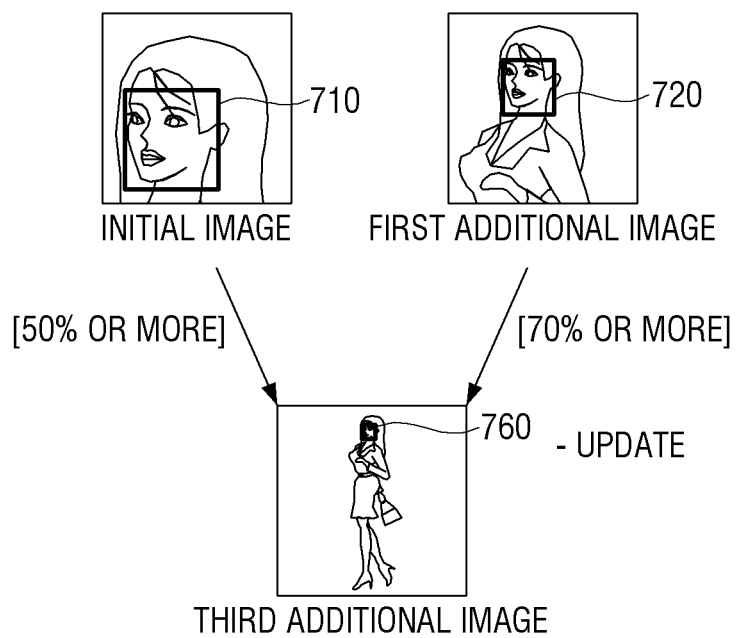

FIGS. 6A to 6C illustrate a method for determining whether to additionally register and update an additional image according to an exemplary embodiment of the present invention.

Referring to FIG. 6A, it may be determined whether to additionally register face data of a first additional image with reference to a ratio of a size of a face included in the first additional image to a size of a face included in an initial image (reference image).

According to an exemplary embodiment of the present invention, on the assumption that a face size 710 of an initial image is a criterion and thus is 100% as shown in view (a) of FIG. 6A, a first additional image may be additionally registered at the database only in response to the size of the face of the first additional image satisfying the first condition, that is, being 70%-100% inclusive of the face size 710 of the initial image.

View (b) of FIG. 6A illustrates that the face size 720 of the first additional image is 80% of the face size 710 of the initial image. In this case, the first additional image satisfies the first condition and thus may be additionally registered at the database. In response to it being determined that the first additional image could be added, the additional registration and update unit may apply histogram stretching to the first additional image, extract characteristic data, establish registration set 1 with corrected images to which the histogram stretching is applied, and store registration set 1 in the storage. Stored registration set 1 may be a reference image for a second additional image and may be a basis for recognizing and updating all images added afterward.

On the other hand, in response to the face size 730 of the first additional image being 60% of the face size 710 of the initial image as shown in view (c) of FIG. 6A, the first condition is not satisfied and thus the first additional image may not be additionally registered at the database.

Referring to FIG. 6B, it may be determined whether to additionally register face data of the second additional image with reference to a ratio of a face size of the second additional image to the face size of the first additional image (reference image). According to an exemplary embodiment of the present invention, on the assumption that the face size 720 of the first additional image is a criterion and thus is 100% as shown in view (a) of FIG. 6B, the second additional image may be additionally registered at the database only in response to the face size of the second additional image satisfying the second condition, that is, being 70%-100% inclusive of the face size 720 of the first additional image.

View (b) of FIG. 6B illustrates that the face size 740 of the second additional image is 80% of the face size 720 of the first additional image. In this case, the second additional image satisfies the second condition and thus may be additionally registered at the database. In response to it being determined that the second additional image could be added, the additional registration and update unit may apply histogram stretching to the second additional image, extract characteristic data, establish registration set 2 with corrected images to which the histogram stretching is applied, and store registration set 2 in the storage. Stored registration set 2 may be a reference image for a third additional image and may be a basis for recognizing and updating all images added afterward.

On the other hand, in response to the face size 750 of the second additional image being 60% of the face size of the first additional image as shown in view (c) of FIG. 6B, the second condition is not satisfied and thus the second additional image may not be additionally registered at the database.

Referring to FIG. 6C, it may be determined whether face data of registration set 2 is updated with the third additional image or not with reference to a ratio of the face size of the third additional image to the face size of the initial image (third condition), and a ratio of the face size of the third additional image to the face size of the first additional image (fourth condition).

According to an exemplary embodiment of the present invention, FIG. 6C illustrates a process of updating in response to the third condition in which the size of the face 760 of the third additional image relative to the face 720 of the first additional image falls within the range of 70%-100% inclusive being satisfied, and in response to the fourth condition in which the size relative to the face 710 of the initial image is 50% or more being satisfied.

In response to the third condition and the fourth condition being satisfied simultaneously, the face 760 of the third additional image may be substituted for the face 720 of the first additional image and registration set 2 of the database may be updated. In this case, the face recognition apparatus 200 can recognize even the face size which is gradually reduced to be 50% of the size of the face 710 of the initial image through the database.

In response to the condition in which the size of the face of the third additional image relative to the face of the second additional image falls within the range of 70%-100% inclusive being satisfied, and the condition in which the size relative to the face of the first additional image is 50% or more being satisfied, the face of the third additional image may be substituted for the face of the second additional image and registration set 3 may be updated.

Figure 7A:
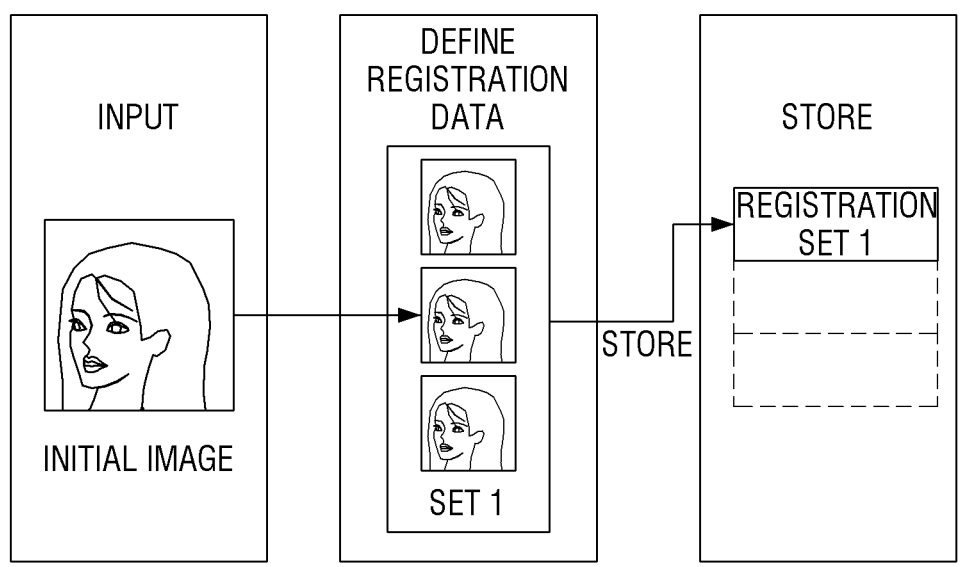
FIGS. 7A to 7C are views illustrating an entire process of establishing a database in a storage and registering an image according to an exemplary embodiment of the present invention.
Figure 7B:
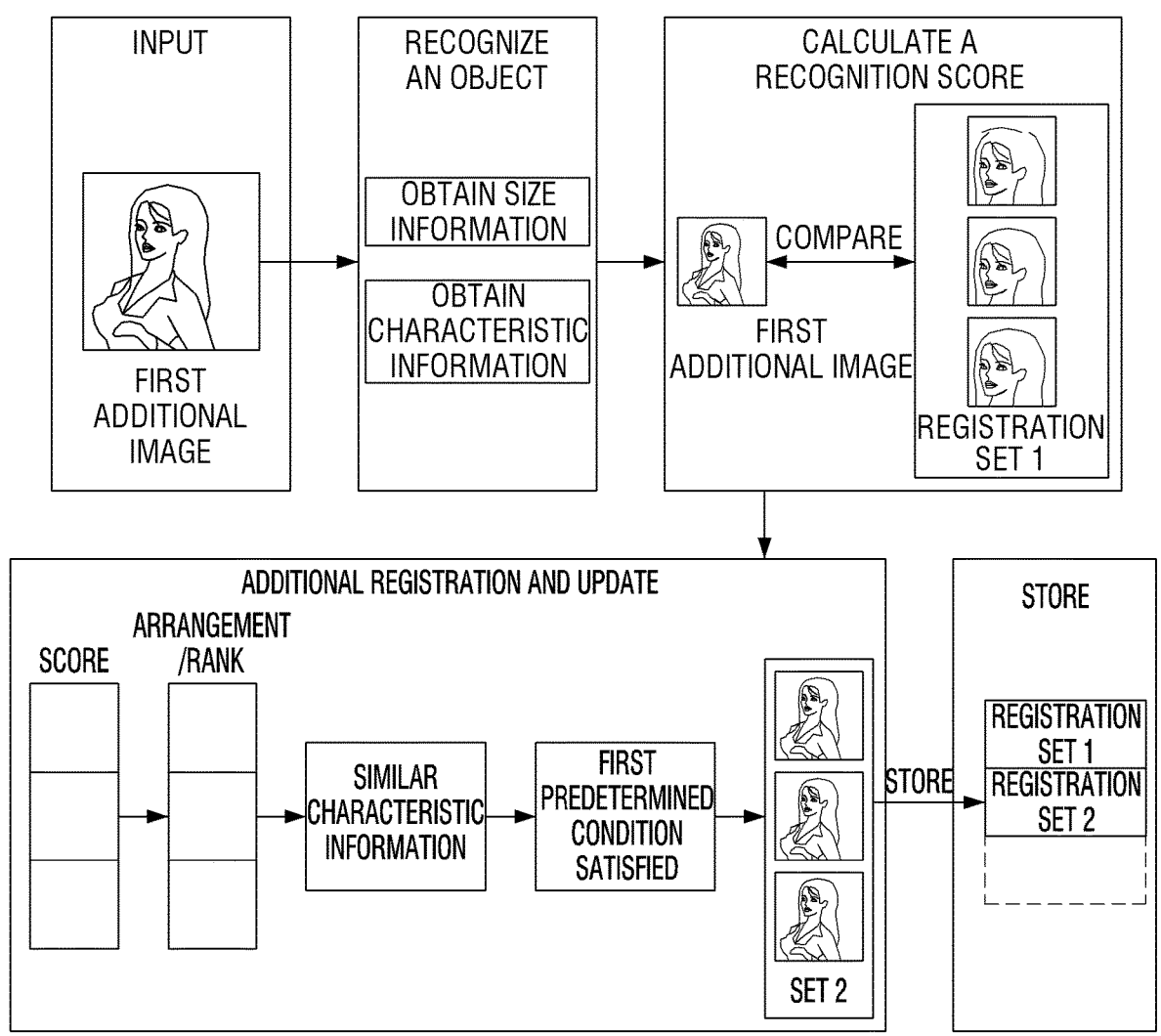
Figure 7C:
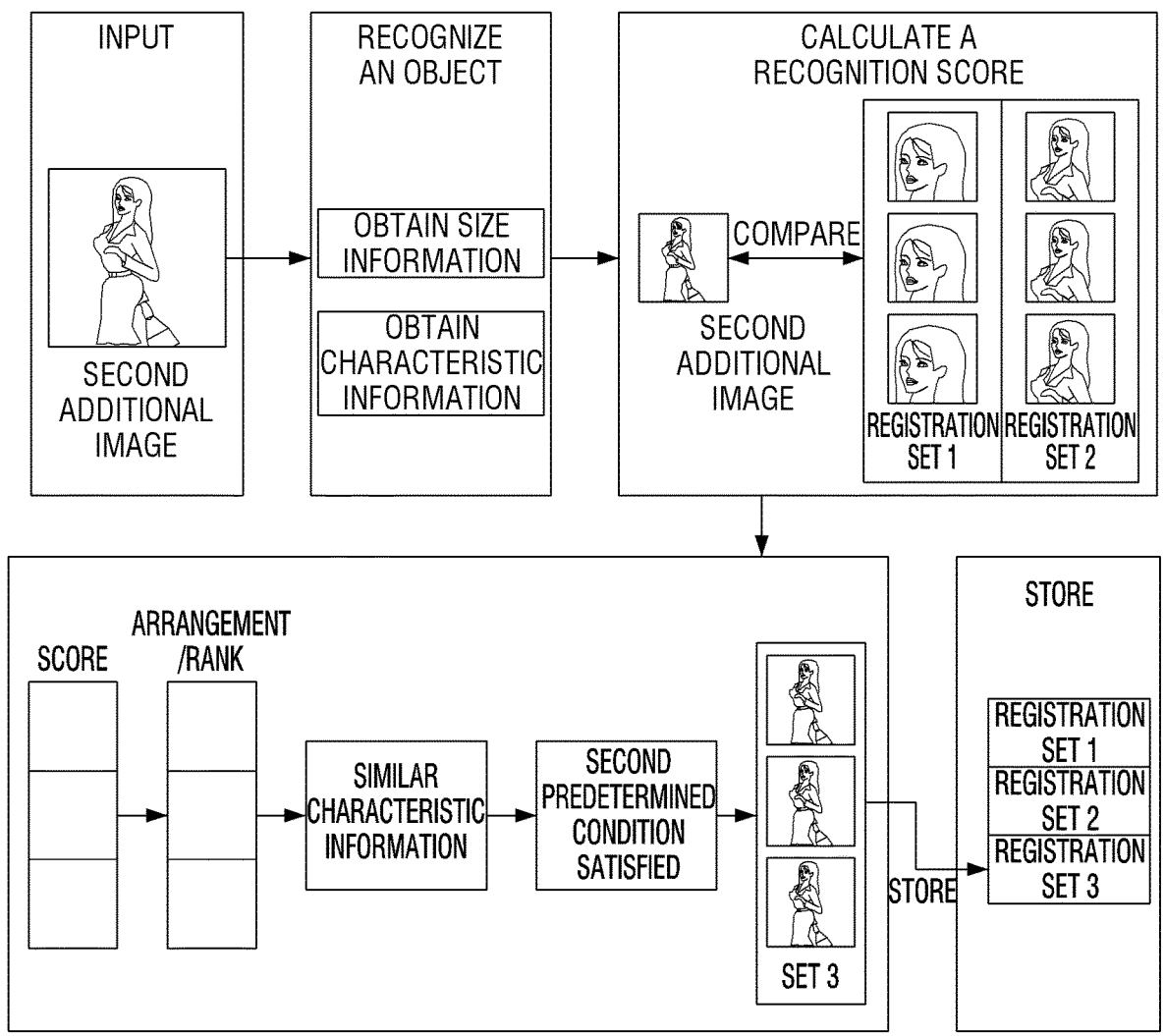

FIGS. 7A to 7C are views illustrating an entire process of establishing a database in the storage and registering an image according to an exemplary embodiment of the present invention.

FIG. 7A is a view showing a process of forming registration set 1 in the database by regarding an initial image as a reference image. In response to the initial image being inputted, registration data may be defined through a histogram stretching process, and registration set 1 may be formed in the database.

FIG. 7B is a view showing a process of forming registration set 2 in the database by regarding a first additional image as a new reference image. In response to the first additional image being inputted, the user's face is recognized by obtaining size information and characteristic information, and calculating three recognition scores regarding the initial image and corrected images in registration set 1. In response to it being determined that the faces are the same by comparing the maximum score value and the minimum score value and a predetermined maximum threshold and a predetermined minimum threshold regarding the characteristic information, it is determined whether the first condition is satisfied or not by comparing the relative size of the face, and, in response to the first condition being satisfied, registration set 2 is formed in the database through the histogram stretching process.

FIG. 7C is a view showing a process of forming registration set 3 in the database by regarding a second additional image as a new reference image. In response to the second additional image being inputted, the user's face is recognized by obtaining size information and characteristic information, and calculating six recognition scores regarding the initial image, the first additional image, and their corrected images in registration set 1 and registration set 2. In response to it being determined that the faces are the same by comparing the maximum score value and the minimum score value and a predetermined maximum threshold and a predetermined minimum threshold regarding the characteristic information, it is determined whether the second condition is satisfied or not by comparing the relative size of the face, and, in response to the second condition being satisfied, registration set 3 is formed in the database through the histogram stretching process.

Figure 8:
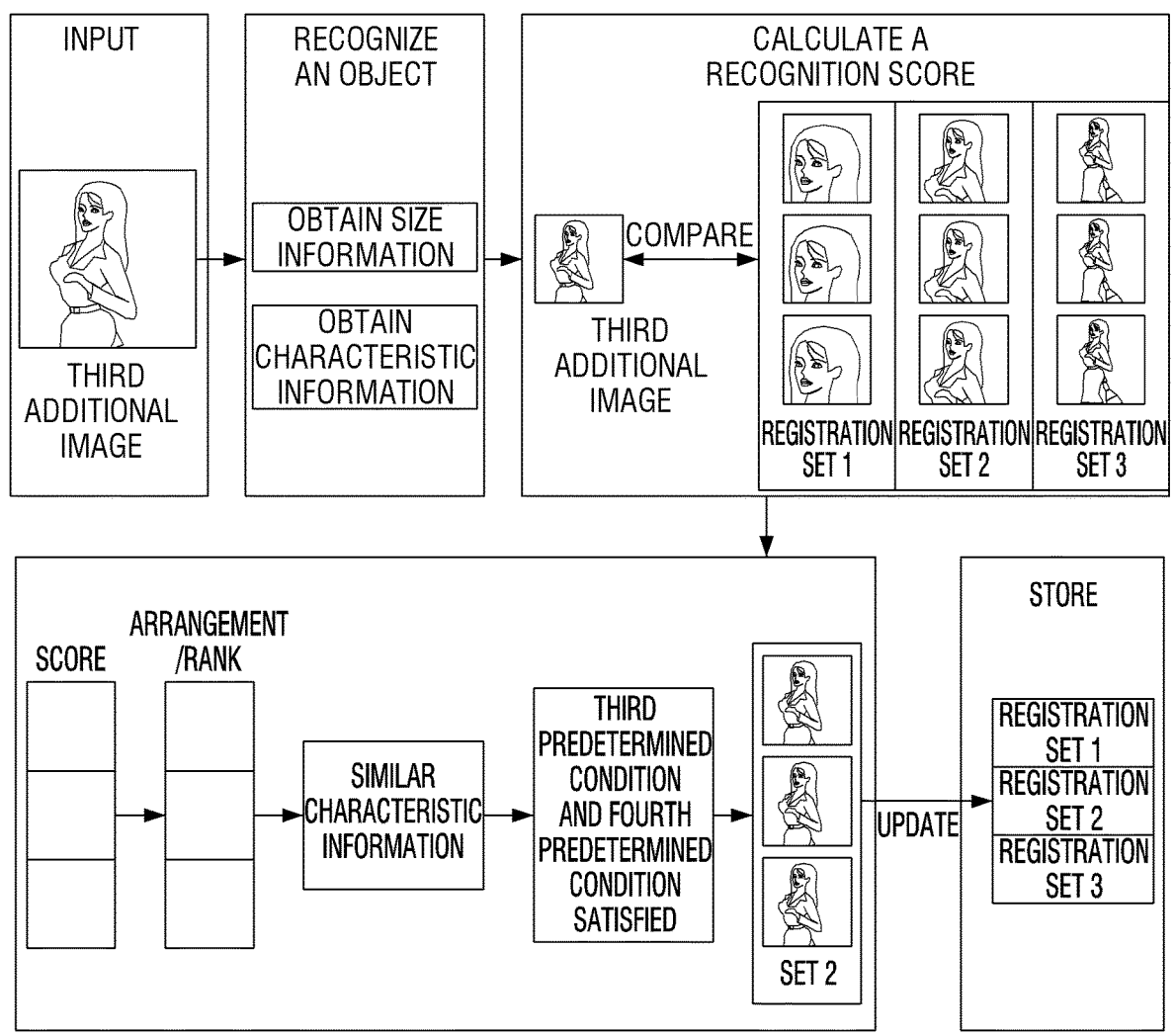
FIG. 8 is a view showing an entire process of updating registration set 2 of a database according to an exemplary embodiment of the present invention.

FIG. 8 is a view illustrating an entire process of updating registration set 2 of the database of the storage according to an exemplary embodiment of the present invention.

Referring to FIG. 8, in response to a third additional image being inputted, the user's face is recognized by obtaining size information and characteristic information, and calculating nine recognition scores regarding the initial image, the first additional image, the second additional image, and their corrected images in registration set 1, registration set 2, and registration set 3. In this case, in response to it being determined that the faces are the same by comparing the maximum score value and the minimum score value and a predetermined maximum threshold and a predetermined minimum threshold regarding the characteristic information, it is determined whether the third condition and the fourth condition are satisfied or not by comparing the relative size of the face, and, in response to the third condition and the fourth condition being satisfied simultaneously, registration set 2 in the database is updated through the histogram stretching process.

Figure 9:
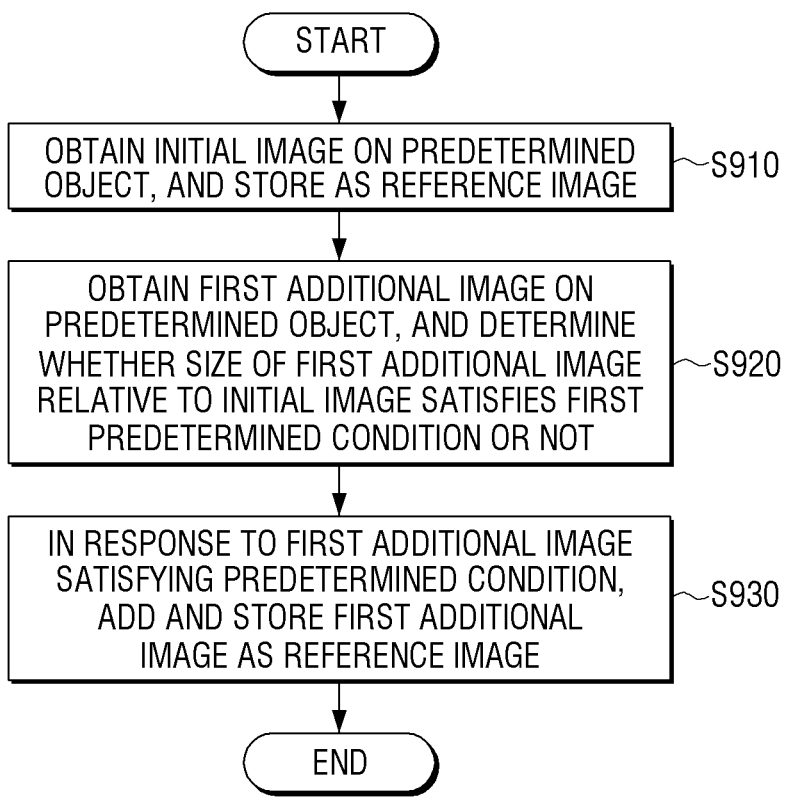
FIG. 9 is a flowchart to illustrate a control method of a face recognition apparatus according to an exemplary embodiment of the present invention.

FIG. 9 is a flowchart to illustrate a control method of a face recognition apparatus according to an exemplary embodiment of the present invention.

First, an initial image regarding a user's face is obtained and stored as a reference image (S910).

Thereafter, a first additional image regarding the user's face is obtained, and it is determined whether the size of the face included in the first additional image relative to the face included in the initial image satisfies a first predetermined condition or not (S920).

Thereafter, in response to the first initial image satisfying the predetermined condition, the first additional image is added and stored as a reference image (S930).

In step S910 of storing as a reference image, a registration set may be formed by applying histogram stretching to the initial image. This process may be applied to subsequent steps of adding and storing additional images as reference images in the same way.

In addition, this process may be similarly repeated in response to a second additional image regarding the user's face being obtained thereafter.

FIG. 10 is a flowchart to illustrate a method for controlling additional registration of a face recognition apparatus according to an exemplary embodiment of the present invention.

According to a method for additionally registering a first additional image of the face recognition apparatus shown in FIG. 10, an initial image regarding a user's face is obtained by photographing or inputting image data (S1005).

Next, corrected images having their lights and darks corrected are additionally obtained by applying histogram stretching to the initial image (S1010).

Thereafter, a set is formed with the initial image and the corrected images, and is registered at the database as a reference image (S1015). Herein, the reference image is a criterion for recognizing an image added thereafter, additionally registering at the database, or updating.

Next, a first additional image regarding the user's face is obtained by photographing or inputting image data (S1020). Thereafter, recognition scores are calculated by comparing characteristic information of the images forming the pre-stored registration set and characteristic information of the first additional image (S1025).

In step S1030, similarity is determined by comparing the maximum score value (Max_S) and the minimum score value (Min_S), and a maximum threshold (MaxThr) and a minimum threshold (MinThr) of a predetermined similarity range. In response to it being determined that the predetermined range is satisfied (S1030:Y), it is determined that the faces are the same and it is determined whether the first additional image is to be additionally registered at the database (S1035).

In response to it being determined that the predetermined range is not satisfied (S1030:N), it is recognized that the faces are not the same and the process of determining additional registration is not performed and the procedure finishes.

In step S1035, it is determined whether a first condition in which the size of the face included in the first additional image relative to the face included in the initial image is 70%-100% inclusive is satisfied or not. In response to it being determined that the condition is not satisfied (S1035: N), it is determined that the additional registration is not performed and the process of determining the additional registration finishes.

In response to it being determined that the first condition is satisfied (S1035:Y), registration set 2 is established in the database, and histogram stretching is applied to the first additional image (S1040) and registration set 2 is additionally stored as reference images for face recognition (S1045). Then, the process of determining the additional registration finishes.

FIG. 11 is a flowchart to illustrate a method for updating of a face recognition apparatus according to an exemplary embodiment of the present invention.

According to a method for updating a registration set illustrated in FIG. 11, for example, a method for updating registration set 2, a third additional image regarding a user's face is obtained by photographing or inputting image data (S1110).

Thereafter, recognition scores are calculated by comparing characteristic information of images forming a pre-stored registration set and characteristic information of the third additional image (S1120).

In step S1130, similarity is determined by comparing the maximum score value (Max_S) and the minimum score value (Min_S), and a maximum threshold (MaxThr) and a minimum threshold (MinThr) of a predetermined similarity range.

In response to it being determined that the predetermined range is satisfied (S1130:Y), it is determined that the faces are the same and it is determined whether the database is updated or not (S1140).

In response to it being determined that the predetermined range is not satisfied (S1130:N), it is recognized that the faces are not the same and the process of determining updating is not performed and the procedure finishes.

Next, it is determined whether a third condition in which the size of the face included in the third additional image relative to the face included in the first additional image is 70%-100% inclusive is satisfied or not (S1140).

In step S1140, in response to it being determined that the third condition is not satisfied (S1140:N), it is determined that the updating is not performed and the process of determining the updating finishes.

In step S1140, in response to it being determined that the third condition is satisfied (S1140:Y), it is determined whether a fourth condition in which the size of the face included in the third additional image relative to the face included in the initial image is 50% or more is satisfied or not (S1150).

In step S1150, in response to it being determined that the fourth condition is not satisfied (S1150:N), it is determined that the updating is not performed and the process of determining the updating finishes.

In step S1150, in response to it being determined that the fourth condition is satisfied (S1150:Y), registration set 2 is updated (S1170) by applying histogram stretching to the third additional image (S1160), and the process of determining the updating finishes.

According to various exemplary embodiments of the present invention described above, the recognition rate of the object recognition apparatus can be enhanced and thus user convenience can be improved.

A non-transitory computer readable medium which stores a program for performing the object recognition methods according to the present invention in sequence may be provided.

The non-transitory computer readable medium refers to a medium that stores data semi-permanently rather than storing data for a very short time, such as a register, a cache, a memory or like, and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or the like, and may be provided For example, a non-transitory computer readable medium which stores a program for performing the steps of: obtaining an initial image regarding a predetermined object and storing as a reference image; obtaining a first additional image regarding the predetermined object, and determining whether a size of an object included in the first additional image relative to an object included in the initial image satisfies a first predetermined condition or not; and, in response to the first additional image satisfying the predetermined condition, adding and storing the first additional image as the reference image, may be provided.

In the above-described block diagrams showing the terminal device, a bus is not illustrated. However, communication between the elements in the recognition apparatus may be performed through a bus. In addition, the recognition apparatus may further include a processor for performing the above-described various steps, such as a CPU, a micro processor, or the like.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A control method of an object recognition apparatus, comprising:
    storing an initial image including a predetermined object and at least two images which are obtained by applying different histogram stretching to the initial image in a database for reference images for recognition of the predetermined object;
    based on determining that a first additional image includes the predetermined object by comparing with the initial image and the at least two images, identifying whether a size of the predetermined object included in the first additional image relative to the predetermined object included in the initial image and the at least two images satisfies a first predetermined condition;
    based on the first additional image satisfying the first predetermined condition, storing the first additional image in the database for the reference images; and
    performing recognition of the predetermined object with respect to a target image using the reference images stored in the database,
    wherein the predetermined object is a body part of a predetermined person.

2. The control method of claim 1, wherein storing the first additional image comprises, in response to the first additional image satisfying the first predetermined condition, storing at least two images which are obtained by applying different histogram stretching to the first additional image with the first additional image in the database.

3. The control method of claim 1, wherein the identifying whether the first predetermined condition is satisfied comprises, in response to the size of the predetermined object included in the first additional image relative to the predetermined object included in the initial image falling within a range between a first predetermined ratio and a second predetermined ratio, identifying that the first predetermined condition is satisfied.

4. The control method of claim 3, wherein the first predetermined ratio is 70% and the second predetermined ratio is 100%.

5. The control method of claim 1, wherein the identifying whether the first predetermined condition is satisfied comprises, in response to characteristic information of the predetermined object included in the first additional image being similar to characteristic information of the predetermined object included in the initial image, identifying whether the size of the predetermined object included in the first additional image relative to the predetermined object included in the initial image satisfies the first predetermined condition.

6. The control method of claim 1, further comprising:
    obtaining a second additional image including the predetermined object, and identifying whether a size of the predetermined object included in the second additional image relative to the predetermined object included in the first additional image satisfies a second predetermined condition; and
    in response to the second additional image satisfying the second predetermined condition, storing the second additional image in the database.

7. The control method of claim 1, further comprising:
    obtaining a third additional image including the predetermined object, identifying whether a size of the predetermined object included in the third additional image relative to the predetermined object included in the first additional image satisfies a third predetermined condition, and identifying whether the size of the predetermined object included in the third additional image relative to the predetermined object included in the initial image satisfies a fourth predetermined condition; and
    in response to the third additional image satisfying the third predetermined condition and the fourth predetermined condition, updating the first additional image with the third additional image.

8. The control method of claim 7, wherein the third predetermined condition is a condition in which the size of the predetermined object included in the third additional image relative to the predetermined object included in the first additional image is 70%-100% inclusive, and
    wherein the fourth predetermined condition is a condition in which the size of the predetermined object included in the third additional image relative to the predetermined object included in the initial image is 50% or more.

9. The control method of claim 1, wherein the predetermined object is a face of the predetermined person.

10. An object recognition apparatus comprising:
    a storage configured to store a database for reference images for recognition of a predetermined object; and
    a controller configured to:
        store an initial image including the predetermined object and at least two images which are obtained by applying different histogram stretching to the initial image in the database,
        based on determining that a first additional image includes the predetermined object by comparing with the initial image and the at least two images, identify whether a size of the predetermined object included in the first additional image relative to a size of the predetermined object included in the initial image and the at least two images satisfies a first predetermined condition,
        based on the first additional image satisfying the first predetermined condition, store the first additional image in the database for the reference images, and
        perform recognition of the predetermined object with respect to a target image using the reference images stored in the database,
    wherein the predetermined object is a body part of a predetermined person.

11. The object recognition apparatus of claim 10, wherein the controller is configured to, in response to the first additional image satisfying the first predetermined condition, store at least two images which are obtained by applying different histogram stretching to the first additional image with the first additional image in the database.

12. The object recognition apparatus of claim 10, wherein the controller is configured to obtain a third additional image including the predetermined object, identify whether a size of the predetermined object included in the third additional image relative to the predetermined object included in the first additional image satisfies a third predetermined condition, and identify whether the size of the predetermined object included in the third additional image relative to the predetermined object included in the initial image satisfies a fourth predetermined condition, and, in response to the third additional image satisfying the third predetermined condition and the fourth predetermined condition, update the first additional image with the third additional image.

* * * * *